United States Patent [19]
Stonger

[11] Patent Number: 6,048,313
[45] Date of Patent: Apr. 11, 2000

[54] METHOD AND APPARATUS FOR FRACTAL-BASED ENHANCEMENT OF ULTRASOUND IMAGING

[76] Inventor: Kelly A. Stonger, S38 W30420 Wern Way, Waukesha, Wis. 53189

[21] Appl. No.: 09/156,006

[22] Filed: Sep. 17, 1998

[51] Int. Cl.⁷ .............................. A61B 8/00; G06K 9/00
[52] U.S. Cl. ....................... 600/443; 600/447; 600/458; 382/128
[58] Field of Search .................................. 600/443, 447, 600/458; 382/22, 27, 52, 54, 128; 364/724.05, 724.12; 358/455, 457, 458, 459, 465

[56] References Cited

U.S. PATENT DOCUMENTS

| | | | |
|---|---|---|---|
| 5,148,809 | 9/1992 | Biegeleisen-Knight et al. | 600/443 |
| 5,492,125 | 2/1996 | Kim et al. | 600/443 |
| 5,588,435 | 12/1996 | Weng et al. | 600/443 |
| 5,594,807 | 1/1997 | Liu | 382/128 |
| 5,954,653 | 9/1999 | Hatfield et al. | 600/443 |

*Primary Examiner*—Marvin M. Lateef
*Assistant Examiner*—Ali M. Imam
*Attorney, Agent, or Firm*—Dennis M. Flaherty; Christian G. Cabou; Phyllis Y. Price

[57] ABSTRACT

A method and an apparatus for increasing the contrast resolution of computer-generated images using fractal enhancement techniques. Each image frame is divided into blocks of pixels which are sorted into source and destination lists based on their distance from the transmit focal zone. The source list contains overlapping pixel blocks corresponding to ranges within a predetermined distance of the transmit focal zone (i.e., blocks of high resolution). The destination list contains non-overlapping blocks corresponding to ranges outside the focal zone area (i.e., blocks of lower resolution). For each low-resolution block, a computer searches for a high-resolution block having the same brightness and contrast classes, but having a greater block contrast. The high-resolution block meeting these criteria and having the greatest block contrast is substituted for the corresponding low-resolution block in the image frame.

25 Claims, 4 Drawing Sheets

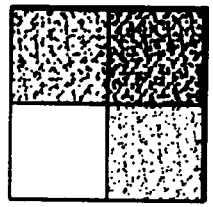
CLASS 0
SWAP = FALSE
FIG.4
CLASS 1
SWAP = FALSE
FIG.6
CLASS 2
SWAP = FALSE
FIG.8
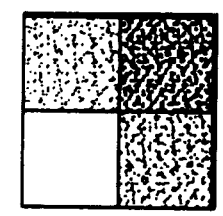
CLASS 0
SWAP = TRUE
FIG.5
CLASS 1
SWAP = TRUE
FIG.7
CLASS 2
SWAP = TRUE
FIG.9

METHOD AND APPARATUS FOR FRACTAL-BASED ENHANCEMENT OF ULTRASOUND IMAGING

FIELD OF THE INVENTION

This invention generally relates to methods for improving the contrast resolution of an image displayed on a video monitor. In particular, the invention relates to methods for improving the contrast resolution of images of the human body displayed on an ultrasound imaging system.

BACKGROUND OF THE INVENTION

Conventional ultrasound scanners create two-dimensional B-mode images of tissue in which the brightness of a pixel is based on the intensity of the echo return. Alternatively, in a color flow imaging mode, the movement of fluid (e.g., blood) or tissue can be imaged. Measurement of blood flow in the heart and vessels using the Doppler effect is well known. The phase shift of backscattered ultrasound waves may be used to measure the velocity of the backscatterers from tissue or blood. The Doppler shift may be displayed using different colors to represent speed and direction of flow. In power Doppler imaging, the power contained in the returned Doppler signal is displayed.

Conventional ultrasound imaging systems comprise an array of ultrasonic transducer elements which are used to transmit an ultrasound beam and then receive the reflected beam from the object being studied. Such scanning comprises a series of measurements in which the focused ultrasonic wave is transmitted, the system switches to receive mode after a short time interval, and the reflected ultrasonic wave is received, beamformed and processed for display. Typically, transmission and reception are focused in the same direction during each measurement to acquire data from a series of points along an acoustic beam or scan line. The receiver is dynamically focused at a succession of ranges along the scan line as the reflected ultrasonic waves are received.

For ultrasound imaging, the array typically has a multiplicity of transducer elements arranged in one or more rows and driven with separate voltages. By selecting the time delay (or phase) and amplitude of the applied voltages, the individual transducer elements in a given row can be controlled to produce ultrasonic waves which combine to form a net ultrasonic wave that travels along a preferred vector direction and is focused at a selected point along the beam. The beamforming parameters of each of the firings may be varied to provide a change in maximum focus or otherwise change the content of the received data for each firing, e.g., by transmitting successive beams along the same scan line with the focal point of each beam being shifted relative to the focal point of the previous beam. In the case of a steered array, by changing the time delays and amplitudes of the applied voltages, the beam with its focal point can be moved in a plane to scan the object. In the case of a linear array, a focused beam directed normal to the array is scanned across the object by translating the aperture across the array from one firing to the next.

The same principles apply when the transducer probe is employed to receive the reflected sound in a receive mode. The voltages produced at the receiving transducer elements are summed so that the net signal is indicative of the ultrasound reflected from a single focal point in the object. As with the transmission mode, this focused reception of the ultrasonic energy is achieved by imparting separate time delay (and/or phase shifts) and gains to the signal from each receiving transducer element.

An ultrasound image is composed of multiple image scan lines. A single scan line (or small localized group of scan lines) is acquired by transmitting focused ultrasound energy at a point in the region of interest, and then receiving the reflected energy over time. The focused transmit energy is referred to as a transmit beam. During the time after transmit, one or more receive beamformers coherently sum the energy received by each channel, with dynamically changing phase rotation or delays, to produce peak sensitivity along the desired scan lines at ranges proportional to the elapsed time. The resulting focused sensitivity pattern is referred to as a receive beam. A scan line's resolution is a result of the directivity of the associated transmit and receive beam pair.

The outputs of the beamformer channels are coherently summed to form a respective pixel intensity value for each sample volume in the object region or volume of interest. These pixel intensity values are log-compressed, scan-converted and then displayed as an image of the anatomy being scanned.

In medical ultrasound imaging systems of the foregoing type, the ultrasound images have areas of relatively high spatial and contrast resolution that are near a transmit focal zone, but that resolution degrades as the distance from a transmit focal zone increases. This problem can be improved by having multiple transmit focal zones, but this will reduce the image frame rate. A method is needed to increase the resolution of ultrasound images in areas away from the transmit focal zone without the need of multiple transmit focal zones.

SUMMARY OF THE INVENTION

The present invention is a method for increasing the contrast resolution of computer-generated images using fractal enhancement techniques. This method has particular application to the display of ultrasound images. The invention also encompasses an apparatus for increasing the contrast resolution of computer-generated images using fractal enhancement. In particular, the invention includes both a computer programmed to perform fractal enhancement of the contrast resolution of an ultrasound image and an ultrasound imaging system incorporating such a programmed computer.

The invention employs one or more metrics used to classify image fragments in a technique known as fractal image compression. This technique is taught in Fractal Image Compression: Theory and Application, Fisher, Y. (ed.), Springer-Verlag, New York (1995). Fractal image compression reduces an image by replacing a set of image pixels with a smaller set of image pixels that share similar characteristics. A transformation equation is applied to the smaller set of image pixels to reproduce the larger set of image pixels to within a predetermined tolerance of fidelity. Central to fractal image compression is the existence of one or more metrics used to classify the image fragments in order to recognize similarity between the fragments. A common scheme is to divide the image into a set of square pixel blocks, and then to classify the blocks based on their brightness and contrast characteristics.

In accordance with the preferred embodiment of the invention, both brightness and contrast classification metrics are used to enhance the contrast resolution of an ultrasound image frame.

These metric methods are independent of block size and geometry. The technique utilized in the preferred embodiment has three phases: initialization, search and replacement.

In the initialization phase, each pixel data set making up a respective acoustic frame stored in memory is classified by a host computer or master controller. First, a source list is created comprising overlapping 4×4 pixel blocks corresponding to ranges that are within a predetermined distance of the transmit focal zone. The pixel blocks on this source list represent blocks of high resolution. Then a destination list is created comprising 4×4 pixel blocks corresponding to ranges that are beyond the predetermined distance from the transmit focal zone, i.e., are outside the focal zone area. The pixel blocks on this destination list represent blocks of lower resolution. The host computer or master controller is programmed to characterize each pixel block in the source and destination lists by finding that block's brightness class (with a swap flag), contrast class, block contrast and base quadrant. The block contrast is a value proportional to the variance of the block. The base quadrant is used in the replacement phase. The process then enters the search phase.

In the search phase, the following steps are performed. For each block in the destination list, the host computer or master controller searches the source list for a match, i.e., a block that has the same brightness class and the same contrast class (i.e., the two blocks are "similar"). If the matching source block is the first match identified, then the number of that source block is saved with a view to it being a possible replacement for the destination block which it matches. If the matching source block is not the first match identified, then the number of the current matching source block is saved (i.e., substituted for the stored matching source block number) if its block contrast is greater than the block contrast of the matching source block identified by the stored matching source block number. By performing repeated iterations, the host computer or master controller searches for the matching source block (i.e., a source block with the same brightness class and contrast class) with the higher contrast. This searching process is carried out for each block in the destination list. Upon completion of the search phase, for each destination block having at least one matching source block, the matching source block with the highest block contrast constitutes the replacement block for that destination block. A table of replacement blocks is stored in computer memory. The method of the preferred embodiment then enters the replacement phase.

In the replacement phase, for each destination block having a replacement block, the pixel data representing the replacement block is substituted for the pixel data representing the destination block. If necessary, the replacement block can be rotated and/or inverted to adopt the same orientation as that of the destination block. The swap flag and base quadrant are used in this process.

Using the foregoing method, the resolution of each acoustic frame of pixel data can be enhanced by substituting high-resolution replacement blocks of pixel data corresponding to ranges near the transmit focal zone for low-resolution blocks of pixel data corresponding to ranges outside the transmit focal zone. This technique has application in imaging modalities other than ultrasound imaging.

BRIEF DESCRIPTION OF THE DRAWINGS

FIGS. 4–9 are diagrams showing the six brightness classes employed in the preferred embodiments of the invention.

DETAILED DESCRIPTION OF THE PREFERRED EMBODIMENTS

Figure 1:
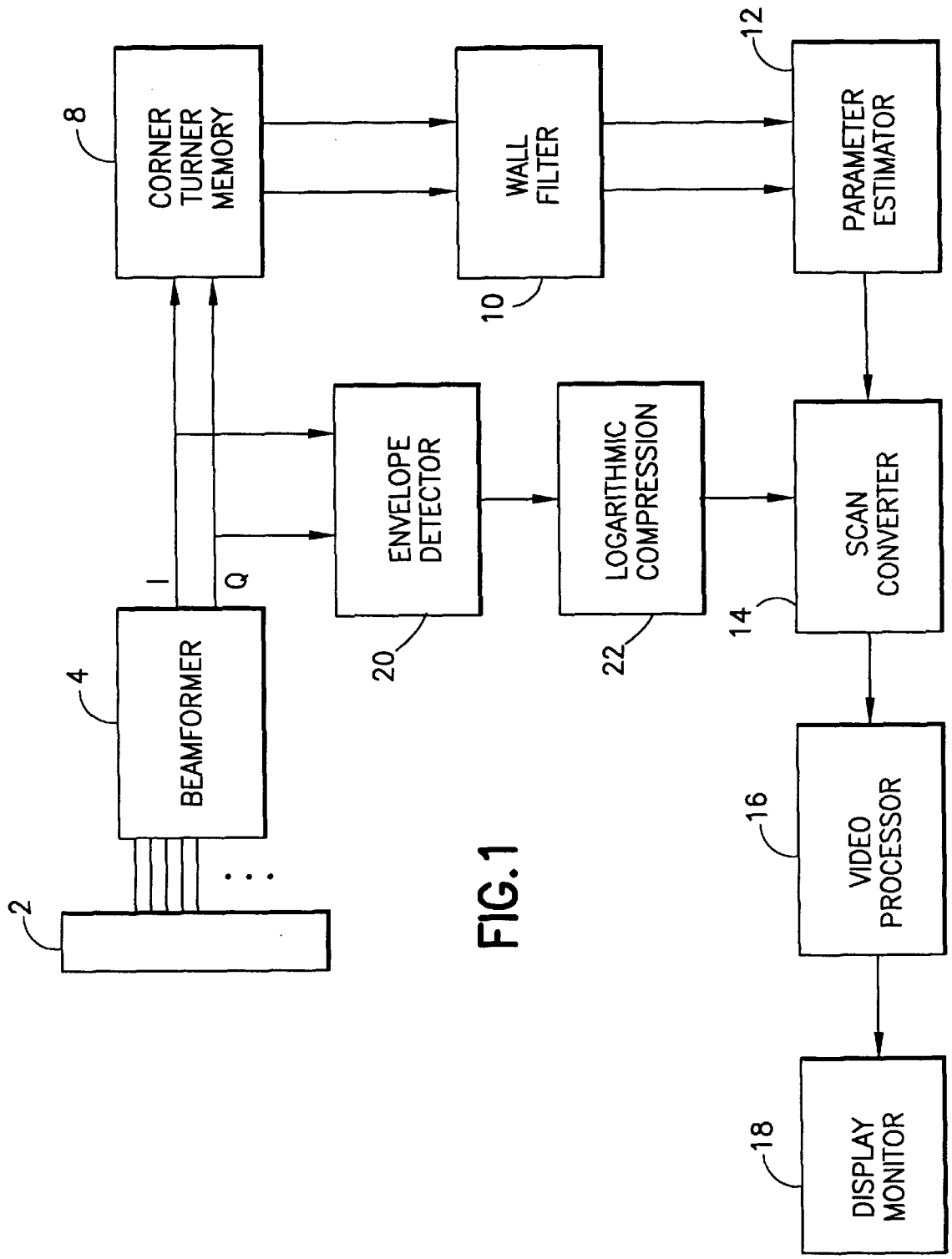
FIG. 1 is a block diagram showing the B mode and color flow mode signal processing chains for an ultrasound imaging system incorporating the present invention.

An ultrasound imaging system incorporating the present invention is shown in FIG. 1. In this system, an ultrasound transducer array 2 is activated to transmit a series of wavelets which are focused at the same transmit focal zone with the same transmit characteristics. Each transmit beam propagates through the object being scanned and is reflected by ultrasound scatterers in the object.

After each transmit firing, the echo signals detected by the transducer array elements are fed to respective receive channels of a beamformer 4. The receive beamformer tracks echoes under the direction of a host computer or master controller (not shown in FIG. 1). The receive beamformer imparts the proper receive focus time delays to the received echo signal and sums them to provide an echo signal which accurately indicates the total ultrasonic energy reflected from a succession of ranges corresponding to a particular transmit focal zone. The beamformer also transforms the RF signal into its I/Q components by means of Hilbert bandpass filtering. The I/Q components are then summed in a receive summer (not shown in FIG. 1) for each transmit firing. Hilbert bandpass filtering can alternatively be performed after beam summation. The output of the beamformer 4 may optionally be shifted in frequency by a demodulator (not shown). One way of achieving this is to multiply the input signal by a complex sinusoidal $e^{i2\pi f_d t}$, where $f_d$ is the frequency shift required.

The I/Q components are then sent to either a B-mode processor or a color flow processor. The B-mode processor incorporates an envelope detector 20 for forming the envelope of the beamsummed receive signal by computing the quantity $(I^2+Q^2)^{1/2}$. The envelope of the signal undergoes some additional B-mode processing, such as logarithmic compression (block 22 in FIG. 1), to form display data which is output to the scan converter 14.

The invention also has application in systems which detect the envelope of the RF signal without the intermediate steps of converting the RF signal to in-phase and quadrature components.

In general, the display data is converted by the scan converter 14 into X-Y format for video display. The scan-converted frames are passed to a video processor 16, which maps the video data to a gray-scale mapping for video display. The gray-scale image frames are then sent to the video monitor 18 for display.

The images displayed by the video monitor 18 are produced from an image frame of data in which each datum indicates the intensity or brightness of a respective pixel in the display. An image frame may, e.g., comprise a 256×256 data array in which each intensity datum is an 8-bit binary number that indicates pixel brightness. The brightness of each pixel on the display monitor 18 is continuously refreshed by reading the value of its corresponding element in the data array in a well-known manner. Each pixel has an intensity value which is a function of the backscatter cross section of a respective sample volume in response to interrogating ultrasonic pulses and the gray map employed.

A conventional ultrasound imaging system typically employs a variety of gray maps, which are simple transfer functions of the raw image data to display gray levels. Multiple gray maps are supported so that different maps may be used depending on the raw image data.

In the color flow mode, the I/Q components are stored in a corner turner memory 8, whose purpose is to buffer data from possibly interleaved firings and output the data as vectors of points across firings at a given range cell. Data is received in "fast time", or sequentially down range (along a vector) for each firing. The output of the corner turner memory is reordered into "slow time", or sequentially by firing for each range cell. The resultant "slow time" I/Q signal samples are passed through respective wall filters 10. Each wall filter acts as either an all-pass filter or a high-pass filter with extremely low cutoff frequency. The wall-filtered outputs are fed into a parameter estimator 12. The parameter estimator 12 processes magnitude and phase values into estimates of power, velocity and turbulence.

In the color flow mode, the color estimates (i.e., power or velocity) are sent to scan converter 14, which converts the color images into X-Y format for video display. The scan-converted frames are passed to a video processor 16, which maps the video data to a display color map for video display. The color flow image frames are then sent to the video monitor 18 for display.

Figure 2:
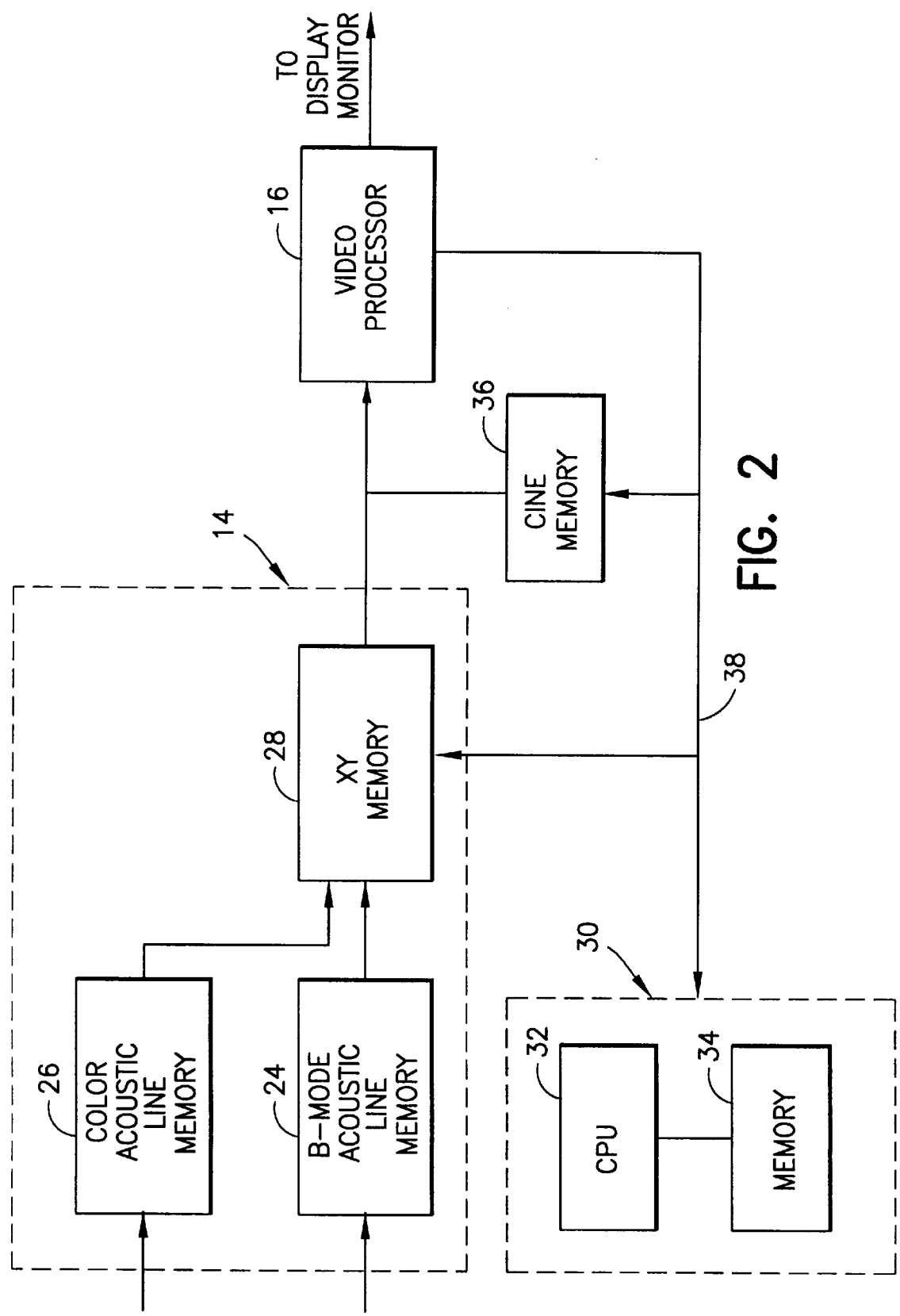
FIG. 2 is a block diagram showing the back end of the ultrasound imaging system shown in FIG. 1, with the addition of a host computer programmed to coordinate operation of the subsystems shown in FIG. 1.

Referring to FIG. 2, system control is centered in the host computer 30, which accepts operator inputs through an operator interface (not shown) and in turn controls the various subsystems. The host computer also generates the system timing and control signals. The host computer 30 comprises a central processing unit (CPU) 32 and a random access memory 34. The CPU 32 is programmed to control the time delays applied by the transmit and receive beamformers, the gain applied by the time-gain control amplifiers in the receive beamformer, and the mapping applied by the video processor. The CPU also performs the fractal enhancement process of the present invention, as described in more detail below.

The scan converter 14 comprises a B-mode acoustic line memory 24 for scan converting B-mode data, a color acoustic line memory 26 for scan converting color flow data and an XY memory 28 for storing each frame of scan-converted data in a respective one of a bank of frame memories. The data stored in the acoustic line memories is transformed to appropriately scaled Cartesian coordinate pixel display data.

In the B mode, the monitor images the time-varying amplitude of the envelope of the signal as a gray scale, i.e., the brightness of a pixel is based on the intensity of the echo return. In the color flow mode, if movement is present, e.g., blood flowing in an artery, a Doppler shift in the return signal is produced proportional to the speed of movements. The display images the flow of blood, i.e., the Doppler shift using different colors, e.g., red for flow toward and blue for flow away from the transducer. In power Doppler imaging, the power contained in the returned Doppler signal is displayed.

If the image to be displayed is a combination of one B-mode frame and one color flow frame, then both frames are passed to the video processor 16, which maps the B-mode data to a gray map and maps the color flow data to a color map for video display. In the final displayed image, the color pixel data is superimposed on the gray-scale pixel data.

Successive frames of color flow or B-mode data are stored in a cine memory 36 on a first-in, first out basis. Storage can be continuous or as a result of an external trigger event. The cine memory 36 is like a circular image buffer that runs in the background, capturing image data that is displayed in real time to the user. When the user freezes the system, the user has the capability to view image data previously captured in cine memory.

The CPU 32 controls the XY memory 28 and the cine memory 36 via the system control bus 38. In particular, CPU 32 controls the flow of data from XY memory 28 to video processor 16 and to cine memory 36, and from cine memory 36 to video processor 16 and to CPU 32 itself. Each frame of pixel data, representing one of a multiplicity of scans or slices through the object being examined, is stored in the XY memory 28 and in the next cycle is transmitted to video processor 16 and to cine memory 36. A stack of frames, representing the scanned object volume, is stored in cine memory 36.

The method of the invention is either applied in real-time to successive frames of pixel data stored in the XY memory 28 or applied (not in real-time) to selected frames of pixel data stored in the cine memory 36. In either case, the pixel data is retrieved from the respective memory by the host computer and enhanced by application of a fractal enhancement algorithm. The pixel data set representing the fractal-enhanced image frame is then returned to memory from where the pixel data had been retrieved.

Figure 3:
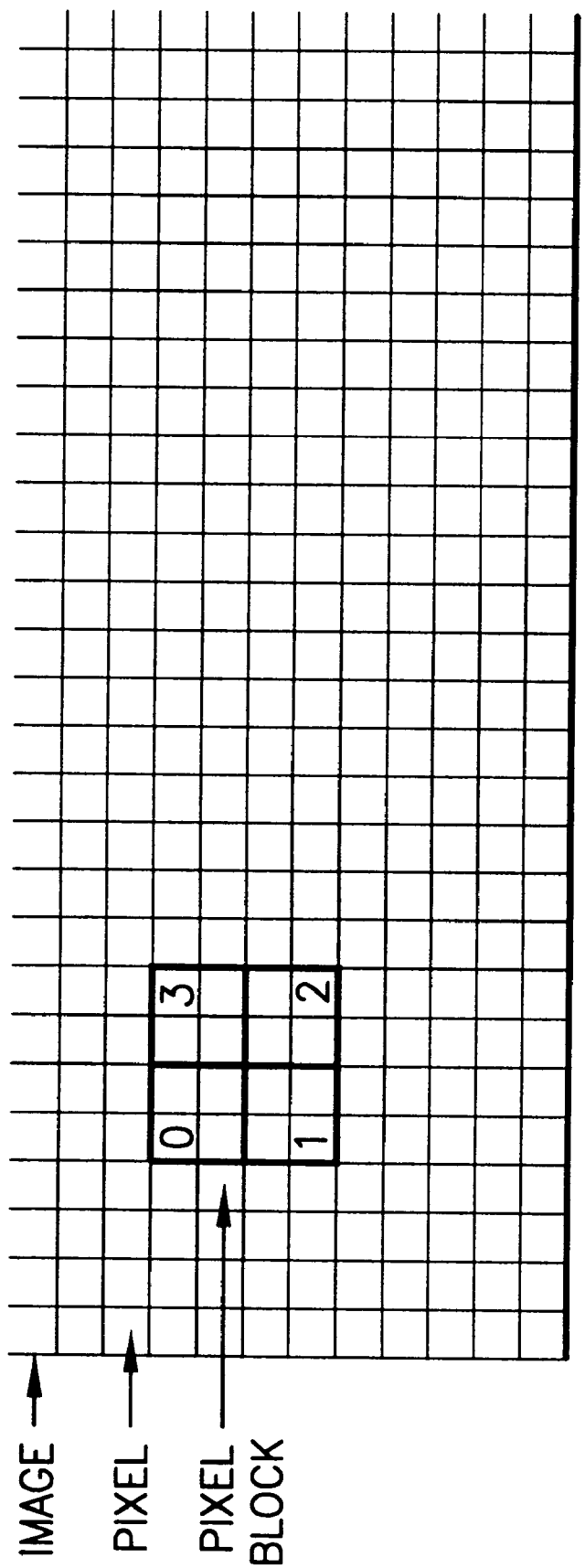
FIG. 3 is a diagram showing a pixel image divided into a set of 4×4 pixel blocks.

In accordance with a first preferred embodiment of the invention, an image frame of pixel data is divided into 4 pixel by 4 pixel blocks as shown in FIG. 3. Each block is characterized by the brightness of the block, its brightness class and swap flag, its contrast class, and a value proportional to the contrast of the block.

To calculate the brightness classification metric, the sum of the pixel values of each quadrant is computed. This gives you a value for each of quadrants 0, 1, 2 and 3. If the sum were divided by the number of pixels in the quadrant, it would represent the average brightness value of that quadrant. The division is not necessary since the brightness classification scheme only requires a value that is proportional to the brightness. A SUM array is used to contain the quadrant sum data: SUM[0] contains the sum of the pixel values for quadrant 0; SUM[1] contains the sum of the pixel values for quadrant 1; SUM[2] contains the sum of the pixel values for quadrant 2; and SUM[3] contains the sum of the pixel values for quadrant 3. A QUAD array is used to contain the quadrant number of the data in the corresponding SUM array: QUAD[0]=0 since SUM[0] contains the sum of quadrant 0's pixel values; QUAD[1]=1; etc. The data in the SUM array is then rank sorted in order of decreasing brightness and the QUAD array is updated as sorting is performed in order to keep track of the associated quadrant numbers. When the sort is completed, the number of the brightest quadrant is in QUAD[0]. The quadrant number in QUAD[0] is saved as the base quadrant. This information will be used in the replacement phase. The quadrant numbers in the QUAD array are then modified by applying Eq. (1):

$$SFQN = (QN - BQ + 4) \text{ modulo } 4 \tag{1}$$

where SFQN denotes standard form quadrant number, QN denotes quadrant number and BQ denotes base quadrant, i.e., the quadrant number of the brightest quadrant. The above algorithm performs a "virtual" rotation of the quadrants into a standard form required to determine the brightness class, i.e., the sorted list is converted into a standard form by rotating the quadrants of the block until the brightest quadrant is in quadrant 0 (shown in FIG. 3). (If the pixel data were actually moved into the sorted configurations, the six cases shown in FIGS. 4–9 would result.)

Once the quadrants of the block are in standard form, the block brightness class can be determined. The six brightness classes employed in the preferred embodiment are shown in FIGS. 4–9. The index of the QUAD array entry that contains quadrant 2 is arbitrarily taken to be the brightness class (after unity is subtracted). The brightness classes shown in FIGS. 7–9 can be converted into those shown in FIGS. 4–6, respectively, by swapping quadrants 1 and 3. If the brightness of the quadrant in QUAD[1] is less than the brightness of the quadrant in QUAD[4], then the swap flag is set to TRUE. If not, then the swap flag is set to FALSE. This will give brightness classes 0, 1 and 2 along with a swap flag.

To calculate the contrast classification metric, the contrast of the 4 pixel by 4 pixel block that is in standard form is determined by computing the variance of the pixel values $p_{xy}$ as follows:

$$BC = \frac{1}{15}\left(\sum_{y=1}^{4}\sum_{x=1}^{4} p_{xy}^2 - \frac{1}{16}\left(\sum_{y=1}^{4}\sum_{x=1}^{4} p_{xy}\right)^2\right) \quad (2)$$

where BC denotes block contrast. To compute a value proportional to the contrast, the division by 15 is eliminated. To calculate the contrast class, a value proportional to the variance of each quadrant is calculated as follows:

$$PQC = \left(\sum_{y=1}^{2}\sum_{x=1}^{2} p_{xy}^2 - \frac{1}{4}\left(\sum_{y=1}^{2}\sum_{x=1}^{2} p_{xy}\right)^2\right) \quad (3)$$

where PQC denotes proportional quadrant contrast. The SUM array is used to contain the quadrant contrast data: SUM[0] through SUM[3] contain the contrast values for quadrants 0 through 3 respectively. A QUAD array is used to contain the quadrant number of the data in the corresponding SUM array. The four quadrant contrast data values in the SUM array are then rank sorted in order of decreasing contrast and the QUAD array is updated as sorting is performed in order to keep track of the associated quadrant numbers. The quadrant numbers in the QUAD array are then converted to standard form using Eq. (1). The 4! possible combinations of quadrant contrast and their assigned block Contrast Class numbers are as follows:

| Sorted | Quadrant | Index | Order | Contrast Class |
|---|---|---|---|---|
| 0 | 1 | 2 | 3 | 0 |
| 0 | 1 | 3 | 2 | 1 |
| 0 | 2 | 1 | 3 | 2 |
| 0 | 3 | 1 | 2 | 3 |
| 0 | 2 | 3 | 1 | 4 |
| 0 | 3 | 2 | 1 | 5 |
| 1 | 0 | 2 | 3 | 6 |
| 1 | 0 | 3 | 2 | 7 |
| 2 | 0 | 1 | 3 | 8 |
| 3 | 0 | 1 | 2 | 9 |
| 2 | 0 | 3 | 1 | 10 |
| 3 | 0 | 2 | 1 | 11 |
| 1 | 2 | 0 | 3 | 12 |
| 1 | 3 | 0 | 2 | 13 |
| 2 | 1 | 0 | 3 | 14 |
| 3 | 1 | 0 | 2 | 15 |
| 2 | 3 | 0 | 1 | 16 |
| 3 | 2 | 0 | 1 | 17 |
| 1 | 2 | 3 | 0 | 18 |
| 1 | 3 | 2 | 0 | 19 |
| 2 | 1 | 3 | 0 | 20 |
| 3 | 1 | 2 | 0 | 21 |
| 2 | 3 | 1 | 0 | 22 |
| 3 | 2 | 1 | 0 | 23 |

Using the table of sorted quadrant index order to contrast class, the sorted index order contained in the QUAD array and its associated contrast class can be identified. [Equation (3) and the table of sorted quadrant index order are taken from Fractal Image Compression: Theory and Application, Fisher, Y. (ed.), Springer-Verlag, New York (1995).]

In accordance with the first preferred embodiment of the invention, the host computer divides the characterized pixel blocks into two lists. A source list is created using pixel blocks that are within a user-selectable distance from a transmit focal zone. This list consists of blocks that are overlapping in the x and y dimensions by one quadrant. The overlap is done to increase the variety of the pixel blocks in the source list. All other pixel blocks are added to a destination list and consist of non-overlapping blocks. Since the source list data was taken from an area near a transmit focal zone, it is considered to have a higher spatial and contrast resolution than the data contained in the destination list.

For each entry in the destination list, the host computer searches the source list for an entry of the same brightness class and contrast class. If the source list entry has a greater block contrast than that of the destination list entry, the source list pixel block will be considered a candidate to replace the current destination list pixel block. To allow greater user control, the brightness and contrast of the source entry must also be within a user-selectable tolerance of the brightness and contrast of the current destination list entry. The entire source list is searched for the entry with the greatest contrast that meets the above criteria.

If a source list entry meeting the above criteria is found, that pixel block is substituted for the destination list entry pixel block in the image. During the replacement, the replacement block must be rotated so that its base quadrant is in the same position as the base quadrant of the destination block. After the rotation, quadrants 1 and 3 should be swapped if the swap flags of the replacement block and the destination block are different. This method will replace pixel blocks corresponding to sample volumes that are outside of a transmit focal zone with similar but higher-contrast-resolution pixel blocks corresponding to sample volumes that are inside that transmit focal zone located at or near that transmit focal zone.

The foregoing preferred embodiments have been disclosed for the purpose of illustration. Variations and modifications of the concept of the invention will be readily apparent to persons skilled in the art. For example, the invention is not limited to processing 4×4 pixel blocks, but rather can be extended to m×n pixel blocks, where m and n are positive even integers ≧4. All such variations and modifications are intended to be encompassed by the claims set forth hereinafter.

I claim:
1. An imaging system, comprising:
    a memory for storing an image frame of pixel values;
    an image data processor programmed to perform the steps of:
        (a) segregating m pixel×n pixel blocks of pixel values having an expected high resolution from m pixel×n pixel blocks of pixel values having an expected low resolution, where m and n are positive even integers ≧4;

(b) classifying each pixel block as a function of the brightness and the contrast of respective quadrants within each pixel block;

(c) substituting a high-resolution block having a predetermined brightness class and a predetermined contrast class in place of a low-resolution block having said predetermined brightness class and said predetermined contrast class in said image frame to form an enhanced image frame; and a display device comprising a multiplicity of pixels for displaying said enhanced image frame.

2. The system as defined in claim 1, wherein said classifying step comprises the steps of computing a respective sum of the pixel values for each quadrant of said pixel block, rank sorting said respective sums, and assigning a brightness class to said pixel block as a function of said rank.

3. The system as defined in claim 1, wherein said classifying step comprises the steps of computing a respective variance of the pixel values for each quadrant of said pixel block, rank sorting said respective variances, and assigning a contrast class to said pixel block as a function of said rank.

4. The system as defined in claim 1, wherein said substituting step comprises the step of, if more than one high-resolution pixel block has said brightness and contrast classes, substituting one of said more than one high-resolution pixel blocks having a highest block contrast.

5. The system as defined in claim 4, further comprising the step of computing a block contrast for each high-resolution pixel block as a function of a variance of respective pixel values making up each high-resolution pixel block.

6. The system as defined in claim 1, wherein said image data processor is further programmed to rotate said high-resolution pixel block prior to substitution.

7. The system as defined in claim 1, wherein said image data processor is further programmed to invert said high-resolution pixel block prior to substitution.

8. The system as defined in claim 1, wherein said high-resolution pixel blocks are overlapping and said low-resolution pixel blocks are non-overlapping.

9. The system as defined in claim 1, further comprising:

an ultrasound transducer array comprising a multiplicity of transducer elements;

a transmit beamformer for pulsing selected transducer elements during a series of transmit firings;

a receive beamformer coupled to selected transducer elements of said transducer array for acquiring a respective receive signal subsequent to each transmit firing;

a signal processor programmed to form respective image signals from said receive signals; and a converter for converting said image signals into said image frame of pixel values and storing said image frame in said memory.

10. An imaging system, comprising:

a memory for storing an image frame of pixel values;

means for acquiring a source list of m pixel×n pixel blocks of pixel values from a first region in said image frame and a destination list of m pixel×n pixel blocks of pixel values from a second region outside of said first region in said image frame;

means for classifying each pixel block in said source and destination lists;

means for calculating a pixel block contrast for each pixel block;

means for searching said source list for matching pixel blocks having the same classification as a pixel block in said destination list;

means for substituting a matching pixel block of greatest block contrast for said destination list pixel block in said image frame to form an enhanced image frame; and a display device comprising a multiplicity of pixels for displaying said enhanced image frame.

11. The system as defined in claim 10, wherein said classifying means comprise means for computing a respective sum of the pixel values for each quadrant of said pixel block, means for rank sorting said respective sums, and means for classifying said pixel block as a function of said rank.

12. The system as defined in claim 10, wherein said classifying means comprise means for computing a respective variance of the pixel values for each quadrant of said pixel block, means for rank sorting said respective variances, and means for classifying said pixel block as a function of said rank.

13. The system as defined in claim 10, wherein the pixel blocks of said source list are overlapping and the pixel blocks of said destination list are non-overlapping.

14. The system as defined in claim 10, further comprising:

an ultrasound transducer array comprising a multiplicity of transducer elements;

a transmit beamformer for pulsing selected transducer elements during a series of transmit firings;

a receive beamformer coupled to selected transducer elements of said transducer array for acquiring a respective receive signal subsequent to each transmit firing;

a signal processor programmed to form respective image signals from said receive signals; and a converter for converting said image signals into said raw image frame of pixel values and storing said raw image frame in said memory.

15. A method for enhancing the contrast resolution of an image, comprising the steps of:

storing an image frame of pixel values;

acquiring a source list of m pixel×n pixel blocks of pixel values from a first region in said image frame and a destination list of m pixel×n pixel blocks of pixel values from a second region outside of said first region in said image frame;

characterizing each pixel block in said source and destination lists by determining a brightness class, a contrast class and a block contrast;

for each pixel block in said destination list, searching said source list for matching pixel blocks having the same brightness class and same contrast class;

for each pixel block in said destination list which has at least one matching pixel block, substituting a matching pixel block of greatest block contrast for said respective destination list block in said image frame to form an enhanced image frame; and displaying said enhanced image frame.

16. The method as defined in claim 15, wherein said characterizing step comprises the steps of computing a respective sum of the pixel values for each quadrant of said pixel block, rank sorting said respective sums, and classifying said pixel block as a function of said rank.

17. The method as defined in claim 15, wherein said characterizing step comprises the steps of computing a respective variance of the pixel values for each quadrant of said pixel block, rank sorting said respective variances, and classifying said pixel block as a function of said rank.

18. The method as defined in claim 15, further comprising the step of rotating said matching pixel block of greatest block contrast prior to substitution.

19. The method as defined in claim 15, further comprising the step of inverting said matching pixel block of greatest block contrast prior to substitution.

20. The method as defined in claim 15, wherein the pixel blocks of said source list are overlapping and the pixel blocks of said destination list are non-overlapping.

21. A method for enhancing the contrast resolution of an image, comprising the steps of:

storing an image frame of pixel values;

segregating m pixel×n pixel blocks of pixel values having an expected high resolution from m pixel ×n pixel blocks of pixel values having an expected low resolution, where m and n are positive even integers $\geq 4$;

classifying each pixel block as a function of the brightness and the contrast of respective quadrants within each pixel block;

substituting a high-resolution block having a predetermined brightness class and a predetermined contrast class in place of a low-resolution block having said predetermined brightness class and said predetermined contrast class in said image frame to form an enhanced image frame; and displaying said enhanced image frame.

22. A method for enhancing the contrast resolution of an image, comprising the steps of:

storing an image frame of pixel values;

substituting pixel blocks of pixel values of said image frame having predetermined brightness and contrast characteristics and expected high resolution for pixel blocks of pixel values of said image frame having said predetermined brightness and contrast characteristics and expected low resolution to form an enhanced image frame; and displaying said enhanced image frame.

23. An imaging system, comprising:

a memory for storing a raw image frame of pixel values;

an image data processor programmed to perform the steps of:
  (a) segregating m pixel×n pixel blocks of pixel values having an expected high resolution from m pixel×n pixel blocks of pixel values having an expected low resolution, where m and n are positive even integers $\geq 4$;
  (b) classifying each pixel block as a function of the brightness and the contrast of respective quadrants within each pixel block;
  (c) substituting a high-resolution block having a predetermined brightness class and a predetermined contrast class in place of a low-resolution block having said predetermined brightness class and said predetermined contrast class in said raw image frame to form an enhanced image frame; and a display device comprising a multiplicity of pixels for displaying said enhanced image frame.

24. An imaging system, comprising:

a memory for storing a raw image frame of pixel values;

an image data processor programmed to perform the steps of:
  (a) acquiring a source list of m pixel×n pixel blocks of pixel values from a first region in said raw image frame and a destination list of m pixel×n pixel blocks of pixel values from a second region outside of said first region in said raw image frame, where m and n are positive even integers $\geq 4$;
  (b) classifying each pixel block in said source and destination lists;
  (c) for each pixel block, calculating a block contrast;
  (d) for each pixel block in said destination list, searching said source list for matching pixel blocks having the same classification; and
  (e) for each pixel block in said destination list which has at least one matching pixel block, substituting a matching pixel block of greatest block contrast for said respective destination list pixel block in said raw image frame to form an enhanced image frame; and a display device comprising a multiplicity of pixels for displaying said enhanced image frame.

25. An ultrasound imaging system comprising:

an ultrasound transducer array comprising a multiplicity of transducer elements;

a transmit beamformer for pulsing selected transducer elements during a series of transmit firings;

a receive beamformer coupled to selected transducer elements of said transducer array for acquiring respective receive signal subsequent to respective transmit firings;

a signal processor programmed to form respective image signals from said receive signals;

a converter for converting said image signals into said image frame of pixel values and storing said image frame in said memory;

an image data processor programmed to substitute pixel blocks of pixel values of said image frame corresponding to receive signals from transmit focal zones and having predetermined brightness and contrast characteristics for pixel blocks of pixel values of said image frame corresponding to receive signals from zones outside said transmit focal zones and having said predetermined brightness and contrast characteristics to form an enhanced image frame; and a display device comprising a multiplicity of pixels for displaying said enhanced image frame.

* * * * *